R. E. STURMAN.
TIRE.
APPLICATION FILED JUNE 18, 1912.
1,094,034.
Patented Apr. 21, 1914.
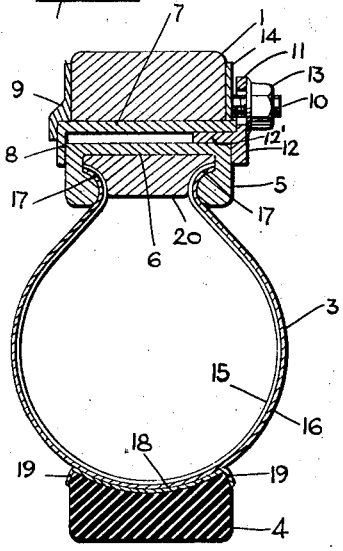
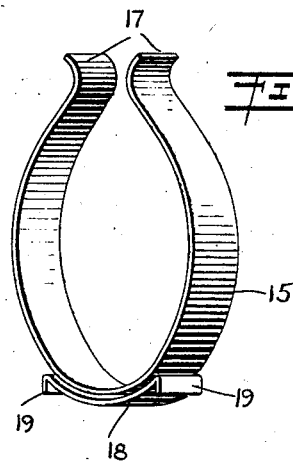
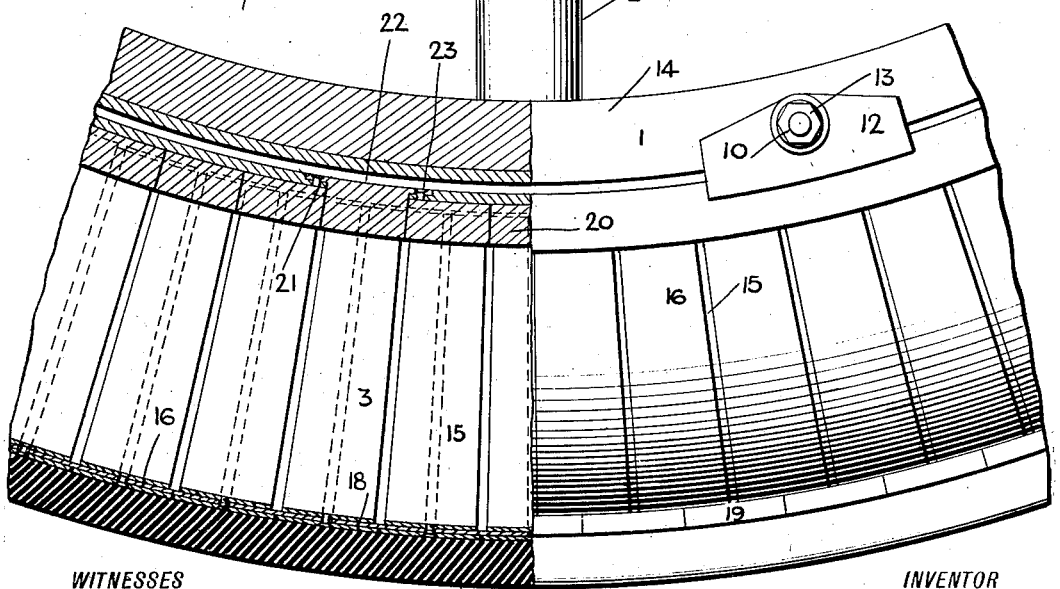
WITNESSES
G. Robert Thomas
Wm. F. Nickel
INVENTOR
Robert E. Sturman
BY Munn & Co
ATTORNEYS

UNITED STATES PATENT OFFICE.

ROBERT E. STURMAN, OF FRANKLIN TOWNSHIP, WRIGHT COUNTY, MINNESOTA.

TIRE.

1,094,034.  Specification of Letters Patent.  Patented Apr. 21, 1914.

Application filed June 18, 1912. Serial No. 704,388.

*To all whom it may concern:*

Be it known that I, ROBERT E. STURMAN, a citizen of the United States, and a resident of Franklin township, in the county of Wright and State of Minnesota, have invented a new and Improved Tire, of which the following is a full, clear, and exact description.

My invention relates to improvements in tires for vehicles, and the object thereof is to produce a tire which will have all the advantages in the way of resilience that are obtained by the use of pneumatic rubber tires, and which will in addition be more durable, less liable to injury and no more expensive than tires of the pneumatic type above referred to. To this end I construct my improved tire of a number of resilient metal sections which are arranged upon the rim or felly of a wheel. These sections are substantially circular in form and are arranged so that the joints between any two of them are overlapped by another section, so as to inclose and protect the same; and the sections are provided with means for securing to the same a tread of solid rubber or other suitable material, thus conforming as closely as possible to the shape of pneumatic tires of the ordinary and commonly-used make.

Reference is to be had to the accompanying drawings forming a part of this specification, in which the same characters of reference indicate the same parts in all the views.

Figure 1 is a transverse section showing my improved tire and the manner in which the same is secured to the rim of a wheel; Fig. 2 is a longitudinal section thereof; Fig. 3 is a perspective view of one of the resilient metal sections; and Fig. 4 is a view of one of the wedge blocks by means of which the metal sections are secured in place.

On the drawings, the numeral 1 indicates the rim or felly of a wheel connected by means of spokes 2 to the hub, and 3 indicates the body of my tire comprising a plurality of resilient metal sections which will hereinafter be more fully described. To these sections is secured a tread of rubber or other suitable material shown at 4, and the combined effect of the metal sections and the rubber tread gives all the strength and rigidity that may be desired in a construction of this sort.

My improved tire is secured to the rim or felly of the wheel shown at 1 by means of a ring or demountable rim 5, which has a dove-tailed groove in the outer face of the same. This groove is shown at 6 in Fig. 1, and widens inward, and the ring 5 is secured to the felly 1 by means of an annular ring 7 having a flange 8 on one side and a detachable plate or ring on the other side. The plate or ring in question is secured to the ring 7 by means of the heads 9 of a plurality of bolts 10, the heads 9 of these bolts engaging the flange 8 on the ring 7, and the bolts themselves passing through the felly, as shown in Fig. 1, and through apertures 11 in the plate or ring above referred to, this plate or ring being indicated by the numeral 12. Nuts 13 are screwed upon the ends of the bolts 10 to join the ring 7 and the plate 12 together, so as to grip the ring 5 between the flange 8 and the ring 12 and hold the ring securely in position. Plates 14 may be placed on the side of the felly 1 between the same and the plates 12, if desired. It will be seen that each of the plates 12 is provided with a rib 12', which extends inward over the ring 7. The ring 7 is thus gripped between the head 9 of the bolt 10 and the plate, so as to be prevented from getting displaced from the felly of the wheel, and at the same time the ribs 12' on the plates 12 will hold the ring 7 snugly against the face of the felly 1.

The metal sections constituting the body of my tire are shown at 15 and 16, and each is substantially circular in form, having outturned ends 17 to engage the sides of the groove 6. The sections 15 are arranged on the inside of the tire, and the sections 16 are arranged on the outside of the sections 15 and close the joints or cracks between the same. The inner sections 15 have secured to the middle parts thereof plates 18 having bent ends 19 which engage the sides of the tread 4. These plates 18 may be secured to the inner sections 15 by means of screws or rivets, these screws or rivets passing through the spaces or cracks between the outer sections 16 and closing these spaces for a distance equal to the length of the plates 18, and thus protecting the outer plate 16 to that extent.

The bent ends 17 of the sections 15 and 16 are secured in the dove-tailed groove 6 by means of wedge blocks 20, which hold the ends 17 against disengagement. These blocks are applied by passing them into an aperture 21 through the ring 5 as fast as the sections 15 and 16 are put in position, these sections being resilient and admitting of the bent ends 17 being pressed toward each other until they enter the groove 6, whereupon they are released. The ends 17 spring apart and engage the sides of the groove, as will be readily understood. The wedges 17 are passed into the aperture 21 and slipped along the groove 6, so as to engage the ends 17 of the sections 15 and 16 as fast as these sections are mounted. The shape of these wedges 20 is shown in Figs. 1 and 4, and it will be seen that they keep the ends 17 in tight engagement with the sides of the groove 6, to prevent any of the sections 15 and 16 from being displaced.

The sections 15 and 16 can be sprung into the groove 6 of the ring 5 at any point, but the wedges must be put in by way of the opening 21 and slipped around in the groove 6 to engage the sections 15 and 16 as fast as they are mounted. The tire can thus be built up near a point opposite the opening 21 around both halves of the wheel, until the opening 21 is reached. Then, when the last sections 15 and 16 are mounted in place, the hole 21 is closed by means of a wedge 22, this wedge having flanges or ribs extending in opposite directions to engage seats at the ends of the hole 21 and be secured thereto by means of screws or rivets 23. The body of the tire is then complete, and the ring 5 can then be mounted on the felly 1 by means of the ring 7, and the screws which secure this ring in proper position.

The tread 4 is of course not secured to the tire until all the metal sections 15 and 16 are in position. It can be stretched to clear the bent ends 19; or, if desired, these ends may be straightened out to permit the tire to be slipped upon the plates 18, and the ends 19, should it be necessary to straighten them out for the purpose described, can afterward be bent over again by any suitable tool to secure the tread 4 in place; but the readiest and most practical way of putting the rubber tread 4 in place is to squeeze or force in the metal sections so as to make the outer circumference of the body of the tire smooth enough to allow the tread to be slipped upon the plates 18 and past the bent ends 19. Afterward, the metal sections are released and they spring back to their natural shape, causing the ends 19 to engage the sides of the tread and hold the same in place.

From the above description it will be seen that I have provided a tire having all the strength and resiliency that is given by ordinary pneumatic tires now in use, and at the same time I obtain greater durability without in any way increasing the cost of manufacture. By making the sections 15 and 16 overlap one another the joints between the inner sections are completely covered and shielded, and the location of the plates 18 also covers the joints between the outer sections for a distance equal to the width of the tread 4. Thus, the entrance of dust and moisture is prevented. At the same time, my tire requires no inflating and consequently no danger of a blowout or puncture need ever be reckoned with.

I wish to have it understood that the above description is illustrative only, and that I do not care to be limited to the exact details herein shown and described, but reserve to myself the right to make such changes in the size, shape and arrangement of the parts as fairly fall within the scope and spirit of my invention.

Having thus described my invention, I claim as new and desire to secure by Letters Patent:

In a resilient tire, the combination of a ring having a dove-tailed groove therein, said ring having an aperture passing through the same, a plurality of sections having outturned ends to be engaged by said groove, wedge blocks for insertion through said aperture into said groove to engage the outturned ends of the sections to hold the same and the ring together, and a wedge block for closing said aperture when the last section has been put in position.

In testimony whereof I have signed my name to this specification in the presence of two subscribing witnesses.

ROBERT E. STURMAN.

Witnesses:
  FRED A. KNOLL,
  JOHN NASLUND.